(12) United States Patent
Watanabe

(10) Patent No.: US 6,937,681 B2
(45) Date of Patent: Aug. 30, 2005

(54) SKEW CORRECTION APPARATUS

(75) Inventor: Takayuki Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 853 days.

(21) Appl. No.: 09/805,110

(22) Filed: Mar. 14, 2001

(65) Prior Publication Data

US 2002/0009169 A1 Jan. 24, 2002

(30) Foreign Application Priority Data

Jul. 21, 2000 (JP) .......................... 2000-220629

(51) Int. Cl.$^7$ .............................................. H04L 7/00
(52) U.S. Cl. ........................................ 375/371; 714/700
(58) Field of Search ................................ 375/371, 373, 375/375, 376, 354, 357; 714/700; 327/237

(56) References Cited

U.S. PATENT DOCUMENTS 6,618,395 B1 * 9/2003 Kimmitt ..................... 370/473

FOREIGN PATENT DOCUMENTS

JP 9-322158 12/1997

* cited by examiner

Primary Examiner—Kevin Burd
(74) Attorney, Agent, or Firm—Staas & Halsey LLP

(57) ABSTRACT

A skew correction apparatus for increasing the data transfer capacity and thus improving the system performance, by making it possible to carry out the deskew work even during the data transfer, is disclosed. The skew correction apparatus receives a plurality of serial data in synchronism, and reduces the skew mount constituting a phase shift between the serial data. A first correction unit (31) detects a skew between the serial data and corrects the skew during the idle time. A second skew correction unit (32) detects a skew between the serial data and corrects the skew during the data transmission.

5 Claims, 12 Drawing Sheets

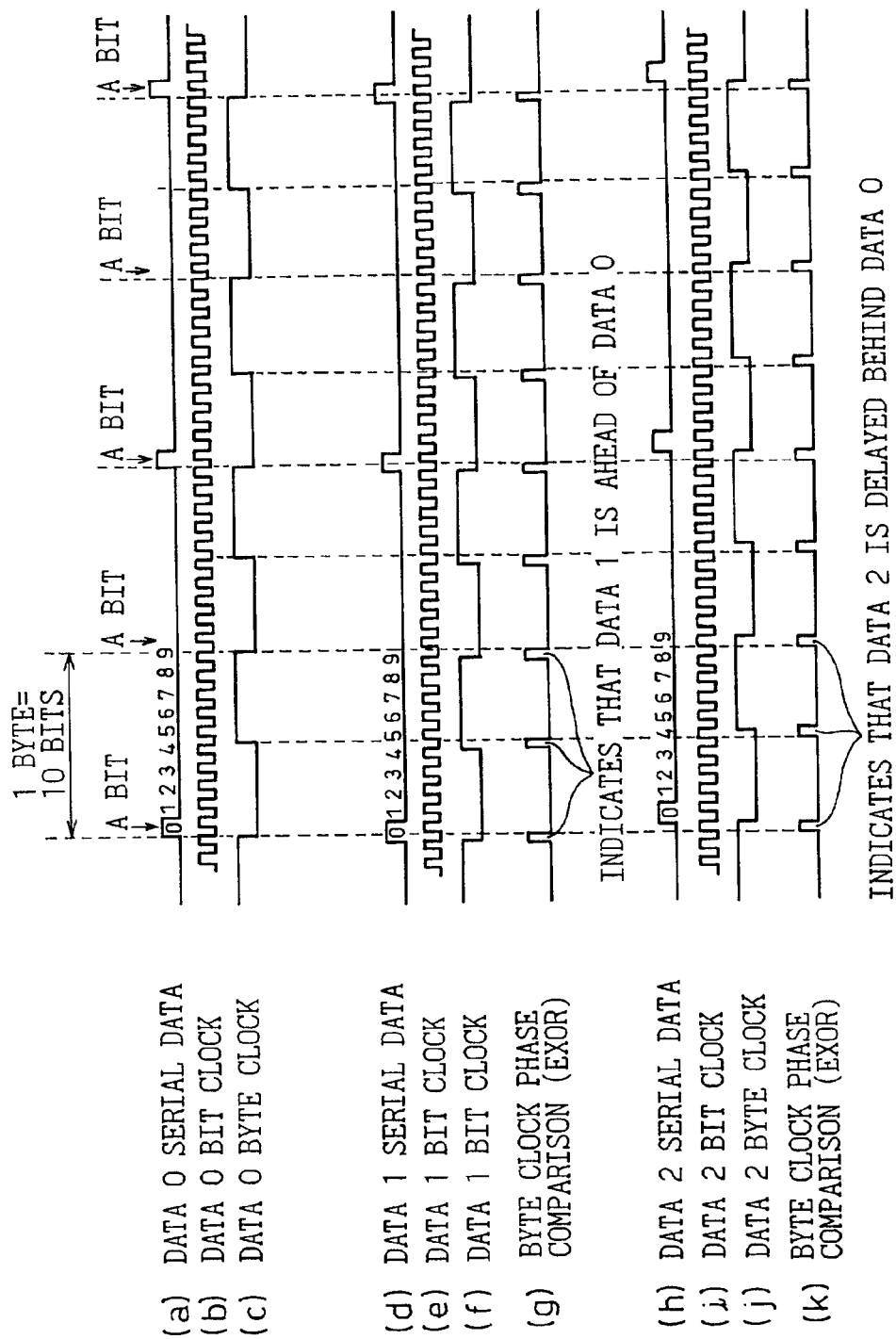

SKEW CORRECTION APPARATUS

BACKGROUND OF THE INVENTION

1. Field of the Invention

The present invention relates to a skew correction apparatus or, in particular, to a skew correction apparatus for reducing the skew amount constituting a phase shift at the receiving end of a data transmission system.

2. Description of the Related Art

FIG. 1 is a block diagram showing the most basic parallel data transmission system according to the prior art. In FIG. 1, data DATA0 to DATA3 and a byte clock signal CLK are transmitted in parallel through a plurality of transmission channels 12-1 to 12-5 between a transmitter 10 and a receiver 11. The DATA0 to DATA3 are each an 8-bit serial data. In the case where variations occur in the device characteristics or the cable transmission delay time between the transmission channels 12-1 to 12-5, the skew constituting a phase shift occurs between transmission channels. As a result, the problem is posed that the increase in data transmission rate and the number of bytes are restrained.

FIG. 2 is a block diagram of a conventional serial bundle parallel data transmission system intended to solve this problem. This system is known, for example, as the Infiniband transmission system proposed by such companies as Sun, Intel and IBM. In FIG. 2, a transmitter 21 includes a clock gate 211 for distributing a byte clock signal (B CL) to encoders and parallel-serial converters, four encoders 212 for converting 8-bit data into 10-bit data for improving the correction quality by avoiding continuous 0s in the data, four parallel/serial converters 213, and four electro-optic converters 214. The receiver 22, on the other hand, includes four opto-electric converters 221, four clock recovery circuits 222, four serial/parallel converters 223 and four decoders 224 corresponding to the four channels. The outputs of the four decoders 224 are input to a deskew circuit 225.

The encoders 212 of the transmitter 21 are each supplied with a clock signal from the clock gate 211, and convert the parallel data DATA0 to DATA3 with one byte constituted of 8 bits into parallel data with one byte constituted of 10 bits. Each of the parallel/serial converters 213 converts parallel data into serial data byte by byte. The serial data are converted from an electrical signal into an optical signal by the electro-optic converters 214 for lengthening the transmission distance and transmitted through an optic fiber.

The optical signal received by the receiver 22 through the optic fiber is converted into an electrical signal by the opto-electric converter 221. The clock signal is reproduced by the clock recovery circuits 222 and converted into a parallel signal by the serial/parallel converter 223. The decoder 224 reproduces the parallel data with one byte constituted of 8 bits from the parallel data with one byte constituted of 10 bits. With the increase in transmission rate (the Infinitiband described above has a width of 400 ps per bit), skewless transmission has physically become impossible and a deskew circuit 225 is required of the data receiver 22. The skew contained in the 8-bit parallel data reproduced is removed by the deskew circuit 225.

Generally, the following described deskew systems are conceived.

(1) At the time of initial set-up of the apparatus (transmission system), a predetermined data pattern for skew correction is transmitted and a delay value of the delay circuit is tuned for each transmission channel at the receiving end.

(2) Before starting the data transmission, a predetermined data pattern for skew correction is transmitted and a delay value is set for each transmission channel in the deskew circuit at the receiving end. In a method of setting a delay value, several stages of shift register are provided for each transmission channel, and the receiving data are received only after passing through the shift registers so that the data patterns for skew correction of the transmission channels are in phase with each other.

In the prior art described above, the deskew work is required to be carried out again in the case the skew conditions undergo a change due to the variations of the device characteristics with temperature or the change in cable layout after initialization for deskew. From the viewpoint of the data transmission quality of the computer system, however, it is not desirable to carry out the deskew work after an error occurs. In order to avoid a data error due to a skew, therefore, the deskew work must be carried out at regular time intervals. The deskew work, however, suspends the data transmission and therefore reduces the data transmission capacity, resulting in a deteriorated system performance.

SUMMARY OF THE INVENTION

The object of the present invention is to provide a skew correction apparatus making the deskew work possible even during the data transmission and thus prevent the deterioration of the data transmission capacity and the system performance due to the deskew work.

In order to achieve the above-mentioned object, according to a first aspect of the invention, there is provided a skew correction apparatus comprising first skew correction means for correcting the skew amount during the idle time when no data is transmitted, and second skew correction means for correcting the skew amount during the data transmission after correcting the skew by the first skew correction means.

In view of the fact that the skew can be corrected even during the data transmission after correcting the skew during the idle session, the data transmission is not required to be suspended even during the deskew operation, and therefore the deterioration of the data transmission capacity and the system performance which otherwise might be caused by the deskew operation can be prevented.

According to a second aspect of the invention, there is provided a skew correction apparatus, wherein the first skew correction means includes an idle state detection circuit for detecting an idle state and a primary skew correction circuit for correcting the delay amount of each of a plurality of serial data as the primary correction at the time of detecting the idle state, and wherein the second skew correction means includes a skew monitor circuit for monitoring the skew amount during the transmission of a plurality of serial data having a delay amount corrected by the primary skew correction circuit and a delay adjust circuit for correcting the delay amount of each of a plurality of serial data in such a manner that the skew amount detected by the skew monitor circuit is reduced to zero.

The provision of the idle state detection circuit eliminates the need of the deskew operation by the operator.

According to a third aspect of the invention, there is provided a skew correction apparatus according to the second aspect, wherein the primary skew correction circuit includes a select circuit for selecting one of a plurality of serial data and a delay amount control circuit for controlling the delay amount of the received serial data so that the phase difference between the selected serial data and each of a plurality of the serial data is minimum.

According to a fourth aspect of the invention, there is provided a skew correction apparatus according to the second aspect, wherein each of a plurality of the received serial data is configured with continuous bytes each having information other than the transmission data at the head thereof. Also, the skew monitor circuit includes a clock recovery circuit, an additional information check circuit and a second delay adjust circuit. The clock recovery circuit extracts a bit clock for identifying the bit of reference serial data, a byte clock for identifying the byte of the reference serial data, an early clock changed later than the byte clock within the range of the timing width corresponding to the additional information contained in the reference serial data, and a delay clock changed later than the early clock within the range of the timing width corresponding to the additional information contained in the reference serial data. The additional information check circuit determines whether the time of change of the early clock and the time of change of the delay clock are included or not in the timing width corresponding to the additional information contained in the serial data received through a channel other than the reference channel. The second delay adjust circuit corrects the delay amount of the serial data of a corresponding channel in such a manner as to reduce the skew amount to zero in the case where it is determined that at least one of the time of change of the early clock and the time of change of the delay clock is not contained in the receive timing width of the additional information contained in the serial data received through a channel other than the reference channel.

The skew is always corrected even during the data transmission simply by adding the additional information to the transfer serial data.

According to a fifth aspect of the invention, there is provided a skew correction apparatus according to the fourth aspect, wherein the additional information is one-bit information of "1" and "0" alternating for each of the continuous bytes. Also, the additional information check circuit includes first and second latch circuits and first and second determination circuits for each channel. The first latch circuit outputs a first latch signal which assumes a first state in the case where the serial data is "1" and assumes a second state different from the first state in the case where the serial data is "0" at the time of change of the early clock. The second latch circuit outputs a second latch signal which assumes a first state in the case where the serial data is "1" and assumes a second state different from the first state in the case where the serial data is "0" at the time of change of the delay clock. The first determination circuit determines whether the output of the first latch circuit deviates from the alternating pattern of "1" and "0" over a predetermined number of bytes. The second determination circuit determines whether the output of the second latch circuit deviates from the alternating pattern of "1" and "0" over a predetermined number of bytes.

The second delay adjust circuit adjusts the delay amount for each channel in such a manner as to advance the phase of the serial data of the particular channel with respect to the reference serial data in the case where the output of the first determination circuit deviates from the alternating pattern of "1" and "0" over a predetermined number of bytes on the one hand, and adjusts the delay amount in such a manner as to delay the phase of the serial data of the particular channel with respect to the reference serial data in the case where the output of the second determination circuit deviates from the alternating pattern of "1" and "0" over a predetermined number of bytes on the other hand.

In a high-speed transmission system, the code conversion is usually employed (for example, 4B5B conversion or 8B10B conversion) to improve the transmission quality. Therefore, the imbalance of the code duty of the transfer data can be eliminated by including the additional information of alternate "1" and "0" in the serial data. As a result, the code conversion which deteriorates the data transfer efficiency can be eliminated.

According to a sixth aspect of the invention, there is provided a skew correction apparatus according to the second aspect, wherein the skew amount monitor circuit includes a reference channel clock recovery circuit, a normal channel clock recovery circuit, a phase comparator/voltage conversion circuit and a second delay adjust circuit. The reference channel clock recovery circuit extracts a reference byte clock for identifying the bytes of the reference serial data. The normal channel clock recovery circuit extracts the normal byte clock for identifying the bytes of the serial data received through a channel other than the reference channel. The phase comparator/voltage conversion circuit detects the phase difference between the phase of the byte clock extracted by the normal channel clock recovery circuit and the phase of the byte clock extracted by the reference channel clock recovery circuit, and converts the phase difference into a voltage value. The second delay adjust circuit corrects the delay amount of the serial data of a corresponding channel in accordance with the voltage value in such a manner as to reduce the skew amount to zero.

As described above, the skew can be always corrected without interrupting the data transmission while adjusting the phase of the byte clock between channels during the data transmission.

BRIEF DESCRIPTION OF THE DRAWINGS

FIG. 12 is a time chart for explaining the operation of the circuit shown in FIG. 10.

DESCRIPTION OF THE PREFERRED EMBODIMENTS

An embodiment of the invention will be described in detail below with reference to the drawings.

Figure 1:
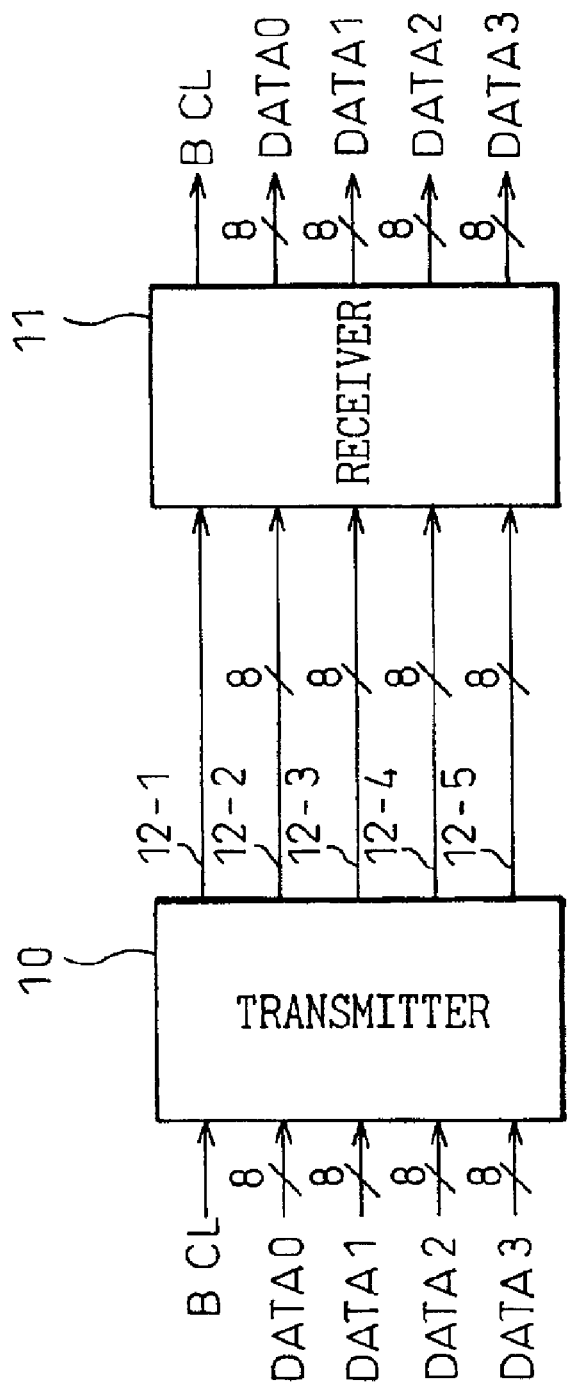
FIG. 1 is a block diagram showing a most basic parallel data transmission system according to the prior art.
Figure 2:
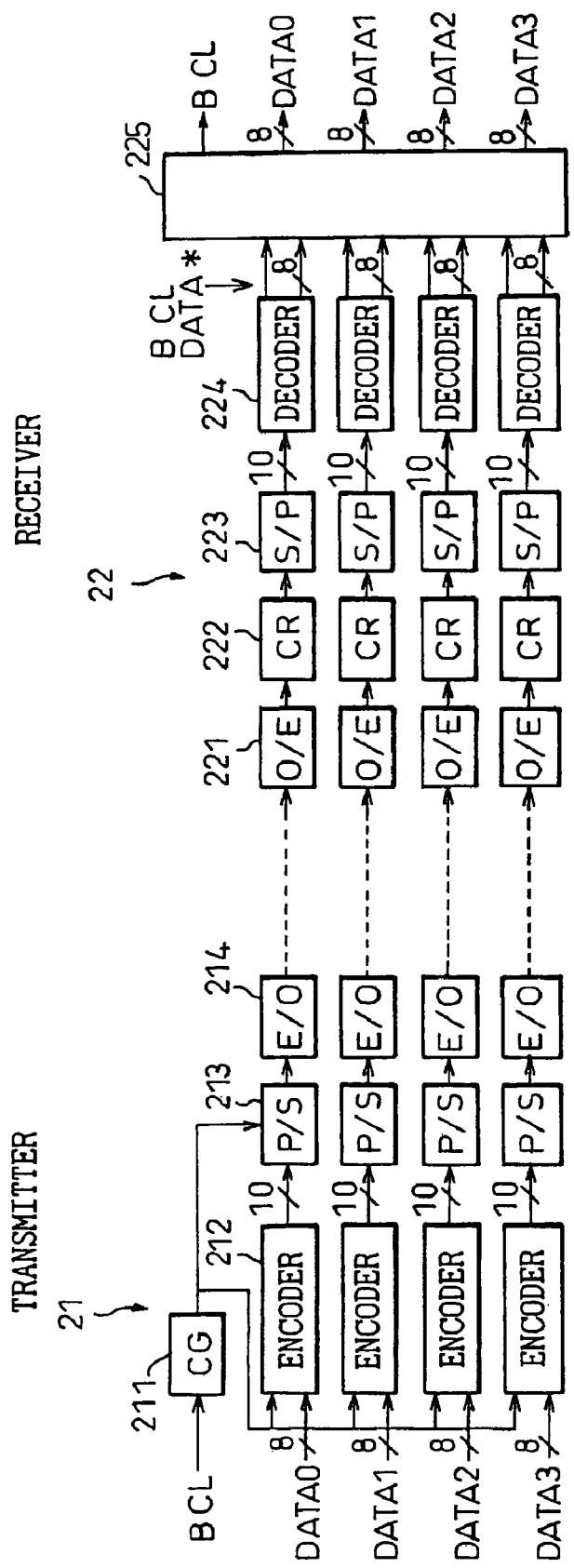
FIG. 2 is a block diagram showing a conventional serial bundle parallel data transmission system.
Figure 3:
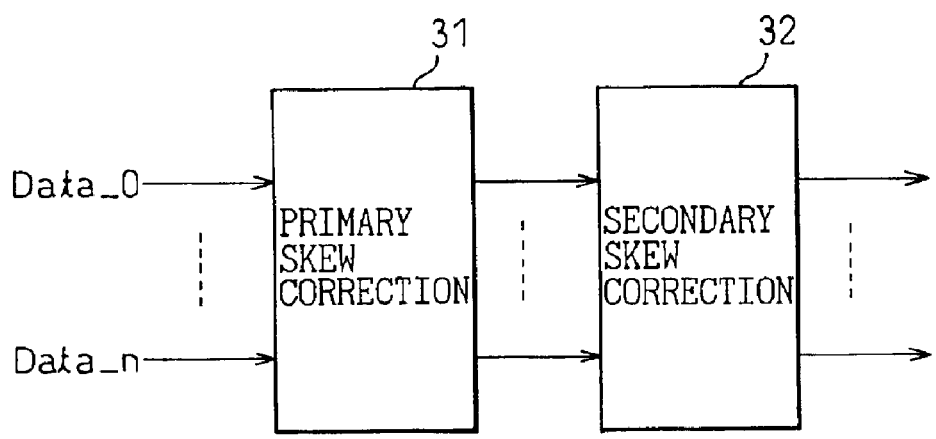
FIG. 3 is a block diagram schematically showing the skew correction circuit according to an embodiment of the present invention.

FIG. 3 is a block diagram schematically showing a skew correction circuit according to the invention. This skew correction circuit is incorporated in a receiver for receiving a plurality of serial data through a plurality of channels and reducing the skew amount constituting a phase shift between the plural serial data. In FIG. 3, each of the data DATA0 to DATAn (hereinafter referred to as the data 0 to n) is serial data. Primary skew correction means 31 detects the skew amount between the plural serial data 0 to n in idle state when no data is transmitted, and corrects each delay amount of the serial data in such a manner as to reduce the skew amount to zero. Secondary skew correction means 32 detects the skew amount generated between a plurality of serial data during the data transmission, based on the state corrected by the primary skew correction means 31, and corrects the delay amount of each of the plural serial data in such a manner as to reduce the skew amount thereof to zero.

Figure 4:
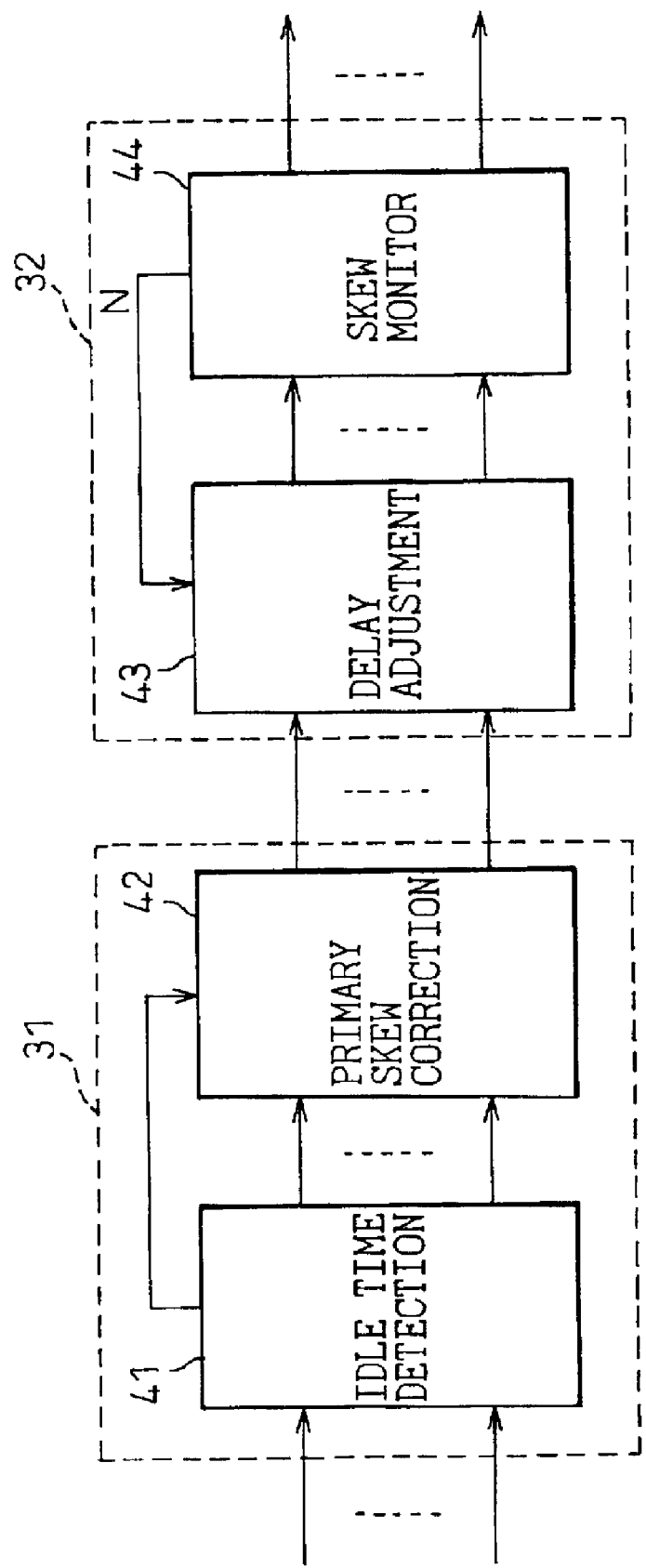
FIG. 4 is a block diagram showing in detail the skew correction circuit of FIG. 3.

FIG. 4 is a block diagram showing the skew correction circuit of FIG. 3 in detail. In FIG. 4, the primary skew correction means 31 includes an idle state detection circuit 41 and a primary skew correction circuit 42. The secondary skew correction means 32 includes a delay adjust circuit 43 and a skew monitor circuit 44.

The idle state detection circuit 41 in the primary skew correction means 31 detects the idle state in which no data is transmitted. The primary skew correction circuit 42 generates a byte sync signal while receiving an idle signal, and monitors the phase difference of the byte sync signals between the channels. The idle signal includes an edge for the primary skew correction and a sync acquisition pattern. While the idle pattern constituting the sync acquisition pattern is being transferred, the skew is corrected by the primary skew correction circuit 42.

Instead of detecting the idle state automatically, the operator may carry out the primary skew correction at regular intervals of time.

The delay adjust circuit 43 in the secondary skew correction means 32 regulates the phase of the receiving data in such a manner as to eliminate the phase shift between the data 0 and n at the time of starting the data transfer.

After the phase of the receiving data is reduced to zero, the skew monitor circuit 44 monitors the additional bit (additional information) added to the leading bit of each byte of the data 0 to n, and in the case where the phase of the additional bit is out of phase by one bit or more, transmits the shift to the delay adjust circuit 43, which adjusts the phase of the receiving data again in such a manner as to reduce it to zero in accordance with the shift thereof.

In this way, the skew correction is made possible even during the data transfer.

Figure 5:
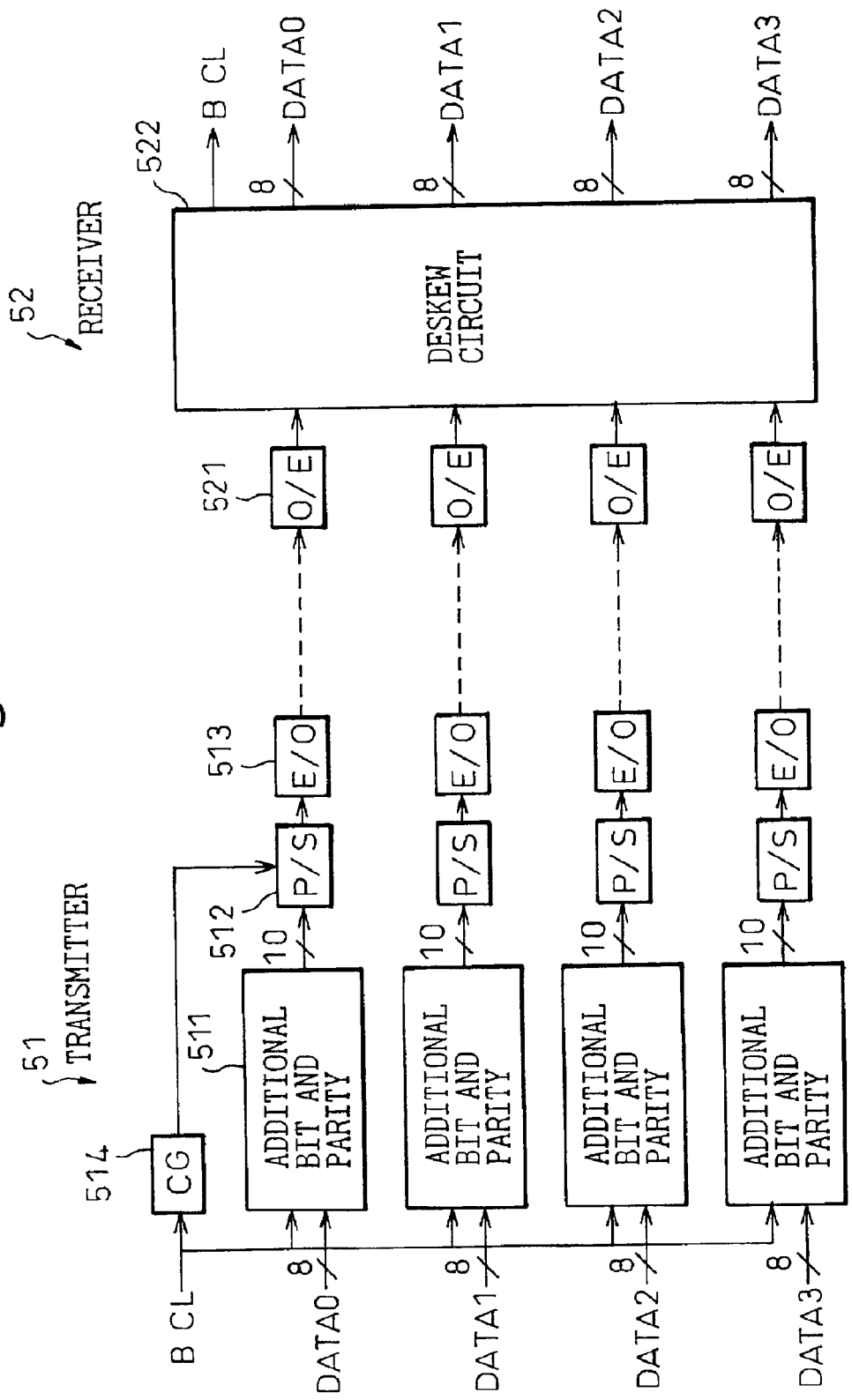
FIG. 5 is a block diagram schematically showing a data transmission system according to an embodiment of the invention.

FIG. 5 is a block diagram schematically showing a data transmission system according to an embodiment of the invention. In FIG. 5, a transmitter 51 includes four bit add circuits 511 for adding an additional bit A and an odd parity bit to each 8-bit parallel data of the data 0 to 3 and converting them to 10-bit data, four parallel/serial converters 512, four electro-optic converters 513, and a clock gate 514 for applying four byte clock signals to the parallel/serial converters 512.

In each of the bit add circuits 511, an additional bit for skew correction is added to the head of each byte (8 bits) of the transmission data, and an odd parity bit is added to the tail of the transmission data of each byte.

The receiver 52 includes four opto-electric converters 521 and one deskew circuit 522.

Figure 6:
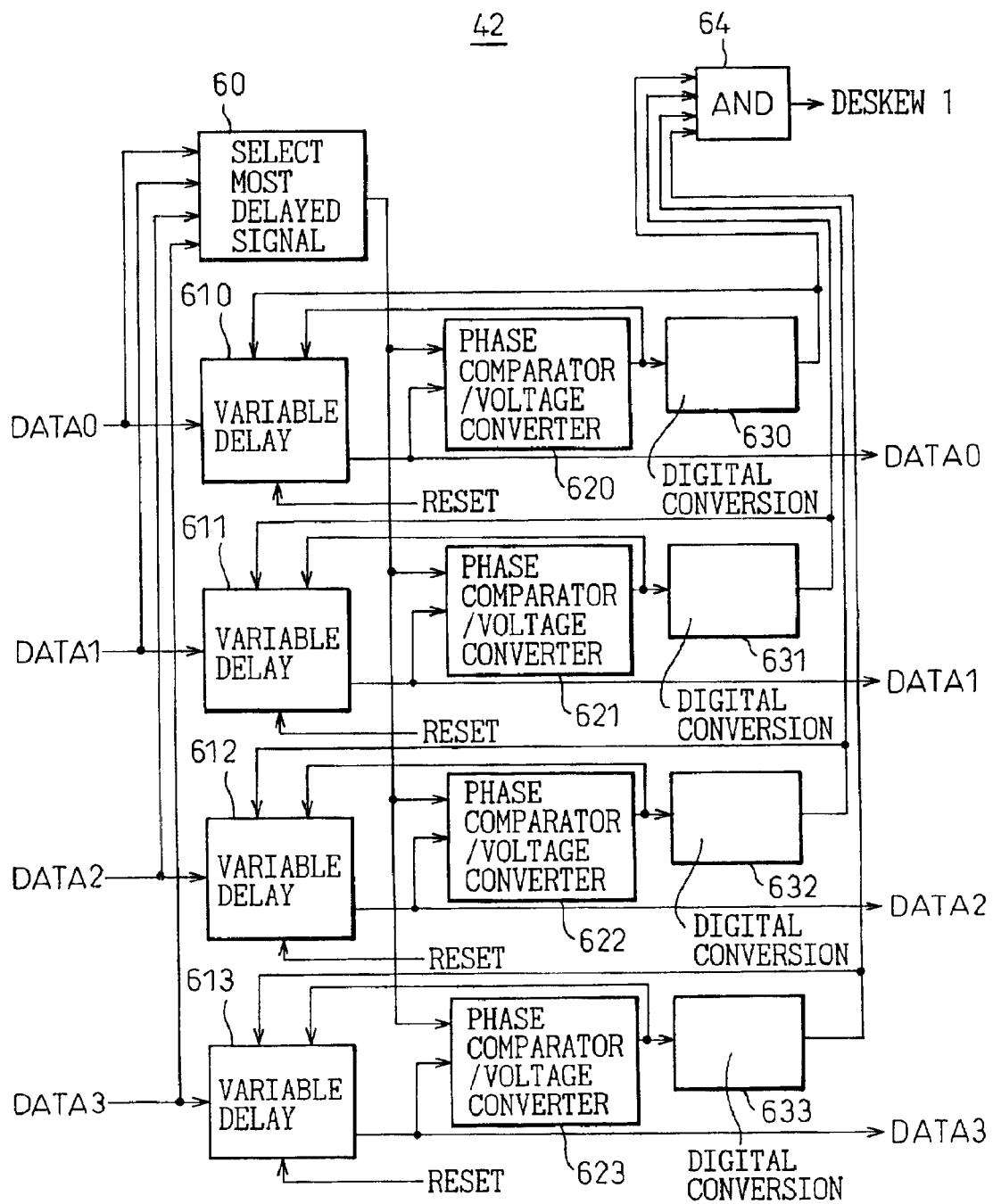
FIG. 6 is a circuit diagram showing a primary skew correction circuit according to an embodiment of the invention.

FIG. 6 is a circuit diagram showing the primary skew correction circuit 42 included in the deskew circuit 522 shown in FIG. 5 according to an embodiment of the invention. In FIG. 6, the primary skew correction circuit 42 includes a maximum delay select circuit 60 for selecting the maximum delay signal from the data 0 to 3 constituting the receiving serial data, first variable delay circuits 610 to 613 for variably delaying the receiving data, phase comparator/voltage converters 620 to 623, digital converters 630 to 613 and an AND gate 64.

Figure 7:
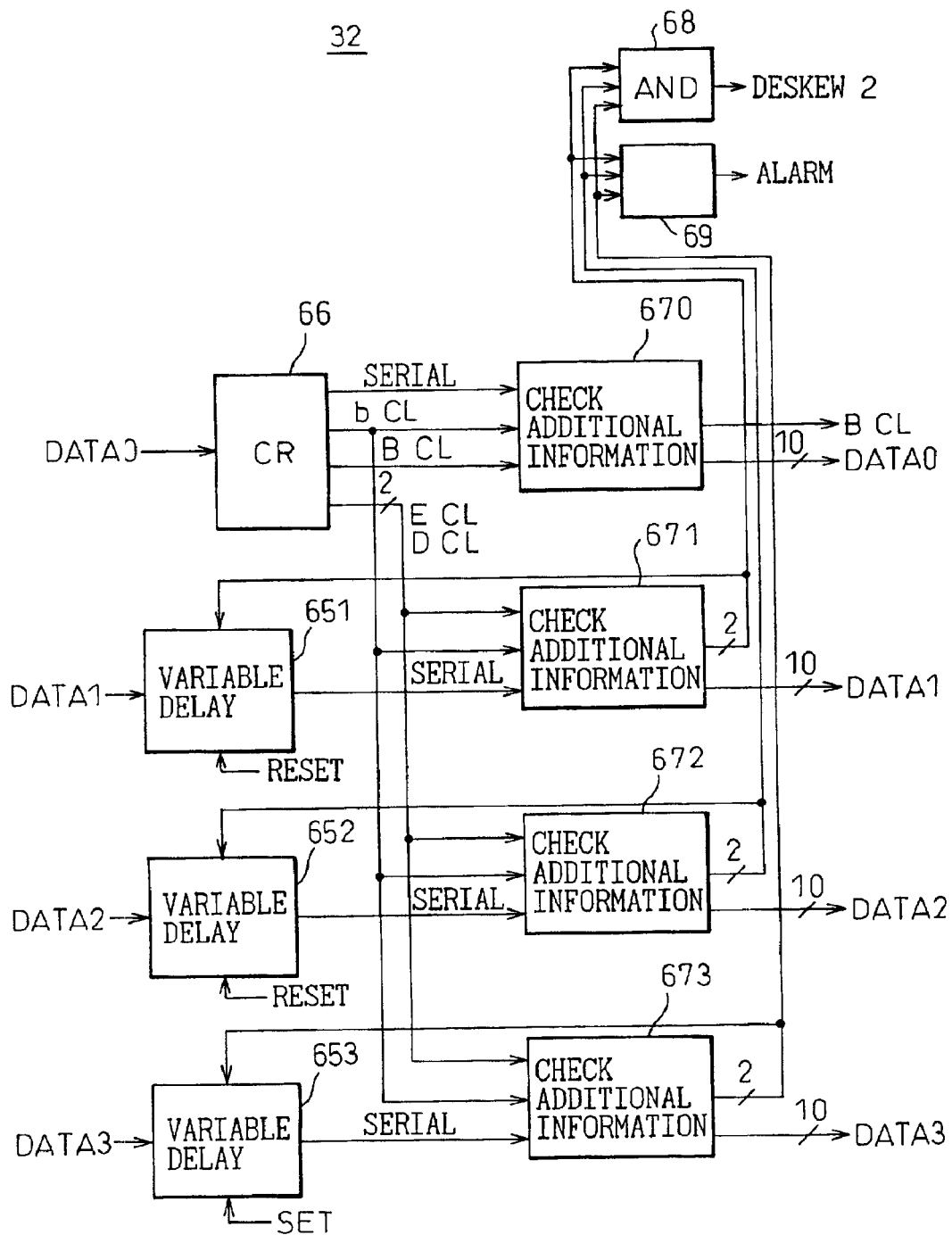
FIG. 7 is a circuit diagram showing a secondary skew correction means according to an embodiment of the invention.

FIG. 7 is a circuit diagram showing the secondary skew correction means 32 of FIG. 3 included in the deskew circuit 522 of FIG. 5 according to an embodiment. In FIG. 7, the secondary skew correction means 32 includes four second variable delay circuits (delay adjust circuits) 651 to 653 for receiving the outputs of the first variable delay circuits 610 to 613 shown in FIG. 6, respectively, a clock recovery circuit 66, four additional information check circuits 670 to 673, an AND gate 68 and a logic circuit 69 for forming an alarm signal.

The clock recovery circuit 66 extracts a bit clock (b CL) for identifying the bits of the reference serial data DATA0 output from the first variable delay circuit 610, a byte clock (B CL) for identifying the bytes of the reference serial data DATA0, an early clock (E CL) changed later than the byte clock within the range of the timing width corresponding to the additional information included in the reference serial data DATA0, and a delay clock (D CL) changed later than the early clock within the range of the timing width corresponding to the additional information included in the reference serial data DATA0.

The additional information check circuits 671 to 673 each determine whether the time of change of the early clock (E CL) and the time of change of the delay clock (D CL) are included in the timing width corresponding to the additional bits included in the serial data DATA1 to DATA3 received through channels other than the reference channel output from the first variable delay circuits 611 to 613.

The second variable delay circuits 651 to 653 correct the delay amount of the serial data of a corresponding channel in such a manner as to reduce the skew amount to zero in the case where it is determined that at least one of the change time of the early clock and the change time of the delay clock is not included in the receiving timing width of the additional bits included in the serial data DATA1 to DATA3 received through channels other than the reference channel output from the first variable delay circuits 611 to 613.

Figure 8:
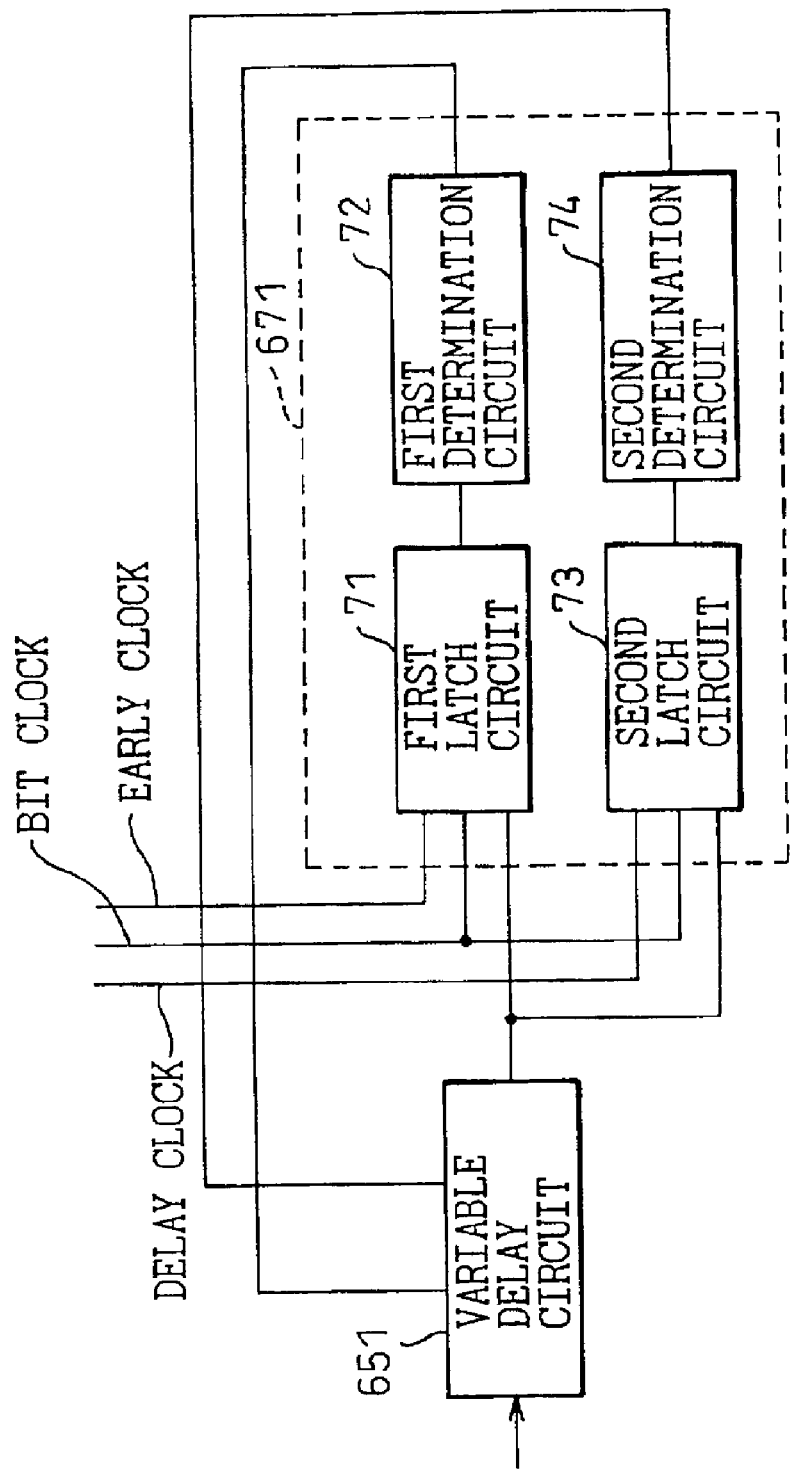
FIG. 8 is a block diagram showing in detail the additional information check circuit 671 of FIG. 7.

FIG. 8 is a block diagram showing in detail the additional information check circuit 671 of FIG. 7. In FIG. 8, the additional information check circuit 671 includes a first latch circuit 71, a first determination circuit 72, a second latch circuit 73 and a second determination circuit 74.

The first latch circuit 71 outputs a first latch signal which assumes a high level (a first state) in the case where the serial data is "1" and a low level (a second state different from the first state) in the case where the serial data is "0" at the time of change of the early clock (E CL).

The second latch circuit 73 outputs a second latch signal which assumes a high level in the case where the serial data is "1" and a low level in the case where the serial data is "0" at the time of change of the delay clock (D CL).

The first determination circuit 72 determines whether the output of the first latch circuit 71 deviates from the alternating pattern of "1" and "0" over a predetermined number of bytes.

The second determination circuit 74 determines whether the output of the second latch circuit 73 deviates from the alternating pattern of "1" and "0" over a predetermined number of bytes.

Figure 9:
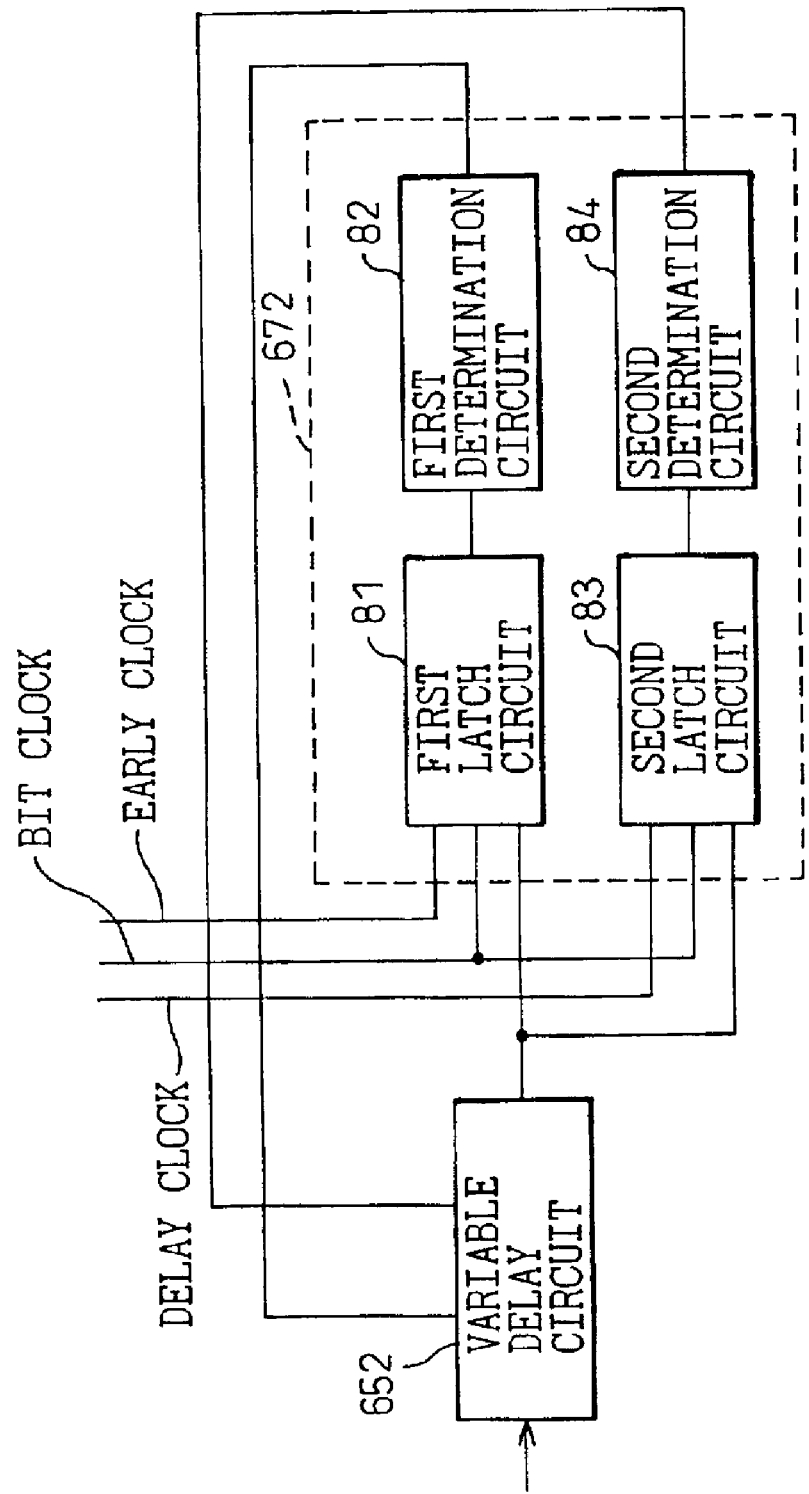
FIG. 9 is a block diagram showing in detail the additional information check circuit 672 of FIG. 7.

FIG. 9 is a block diagram showing in detail the additional information check circuit 672 corresponding to the DATA2 in FIG. 7. The configuration of this circuit is identical to that of the additional information check circuit 671 corresponding to the DATA1 and therefore will not be described.

Figure 10:
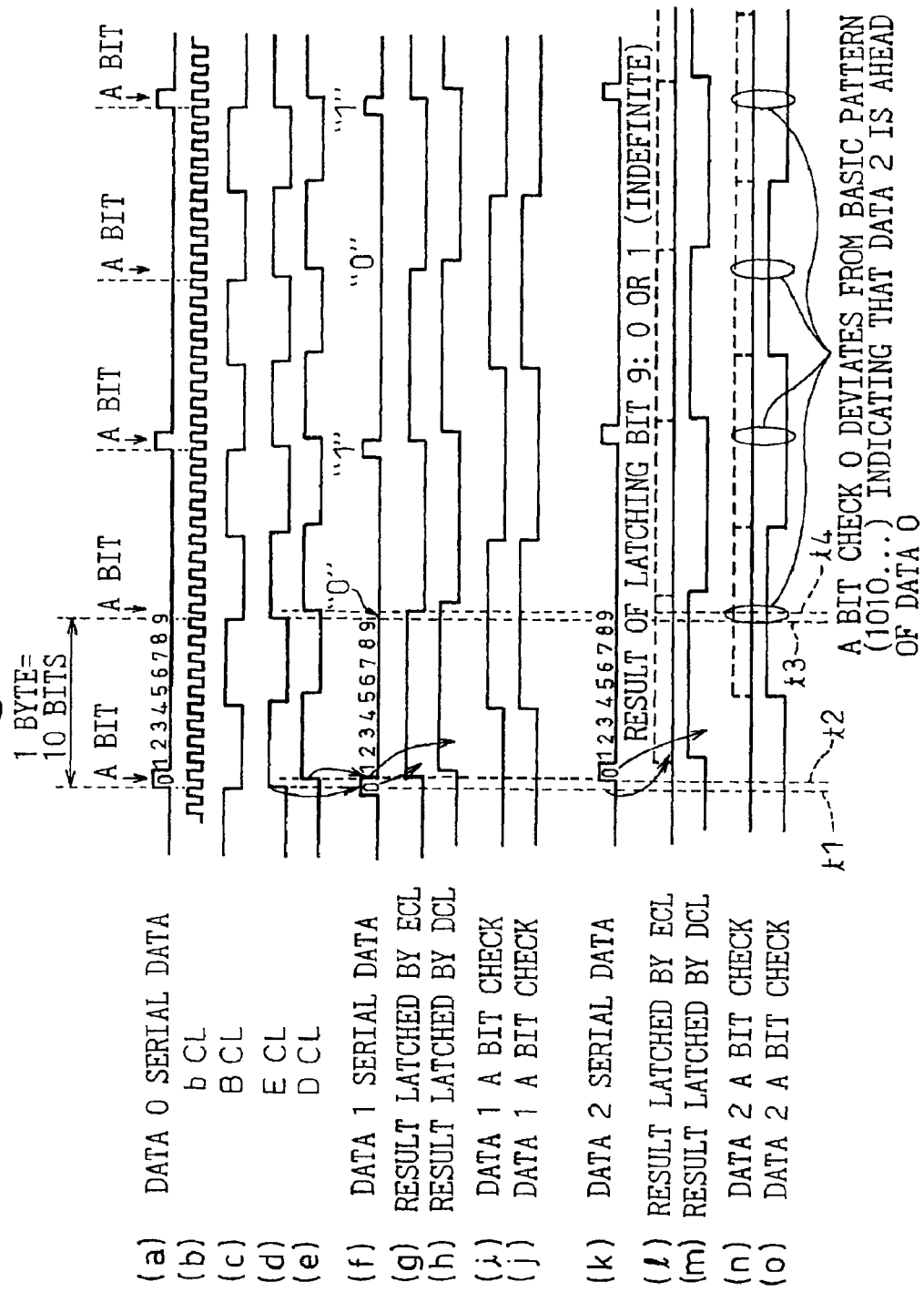
FIG. 10 is a time chart for explaining the operation of the circuit shown in FIG. 6.

FIG. 10 is a time chart for explaining the operation of the circuits shown in FIGS. 6 to 9. In FIG. 10, (a) designates the receiving data. As described above, the data with the additional bit A added to the head of each byte of the transmission data and an odd parity bit added to the end of each byte is transmitted from the transmitting end, and therefore one byte of the receiving data has 10 bits.

First, the operation at the idle time will be explained.

Assume that the transmission data (idle pattern) at the idle time other than the actual data transfer are all "1" and the additional bit is expressed by symbol "A". Also, the bytes on the time axis are separated by symbol "|". The transmission serial data at the idle time is given as shown below.

A111111111|A111111111|A111111111|

The additional bit A alternates between "0" and "1" for each byte on the time axis. As a result, the continuity of the same code bits in the transmission data is suppressed, and therefore the load of the receiving circuit can be reduced. The actual transmission serial data at the idle time is expressed as shown below.

1111111111|0111111111|1111111111|

At the idle time, the receiver thus receives a serial signal having one 0 for every 20 bits and selects a transmission channel with the 0 position most delayed in arrival (hereinafter called the most delayed channel). A method for finding a most delayed channel is already known, and disclosed, for example, in Japanese Unexamined Patent Publication No. 11-298457 entitled "Parallel Optical Transmission/Optical Receiving Module"(U.S. patent application No. 129,407, entitled "PARALLEL OPTICAL TRANSMISSION/RECEPTION MODULE".

At the idle time, the delay value in the variable delay circuits 610 to 613 is set in such a manner that the position of "0" in the bit string received for each transmission channel coincides with the position of "0" in the most delayed channel. Specifically, the time lag (phase difference) between the "0" position of the additional bit A in the signal output from the variable delay circuits 610 to 613 and the "0" position of the bit A in the most delayed channel signal is detected, and the particular phase difference is converted into a voltage difference which is applied to the variable delay circuits 610 to 613. The larger the voltage difference, the larger the delay value. In the case where the position of the additional bit A of the most delay signal coincides with that of the particular channel, one of the outputs of the corresponding phase comparator/voltage conversion circuits 620 to 623 assumes the lowest value. The digital conversion circuits 630 to 633 each detect that the outputs of the phase comparator/voltage conversion circuits 620 to 623 have assumed the lowest value, and in only that case, outputs a high level signal. The time when the outputs of all the digital converters 630 to 633 assume a high level is the time when the skew adjustment between the transmission channels at the idle time has been completed. The delay value at the time of completion of the skew adjustment is fixed in the variable delay circuits 610 to 613.

Now, the operation of the variable delay circuits 651 to 653 at the idle time and during the data transfer will be explained.

Although the channel of DATA0 is set as a reference channel in the apparatus shown in FIG. 7, any channel can be used as a reference channel.

The clock recovery circuit (CR) 66 is provided on the line of the data DATA0 of the reference channel. The clock recovery circuit 66 extracts the bit clock (b CL) shown in (b) of FIG. 10 and the byte clock (B CL) shown in (c) of FIG. 10 from the receiving data. The bit clock hits one bit of the serial data, while the byte clock hits the additional bit A and is used for recognizing the bytes on the time axis.

The clock recovery circuit 66 also generates an early clock E CL ((d) in FIG. 10) somewhat delayed in phase from the original byte clock and a delay clock D CL ((e) in FIG. 10) somewhat delayed in phase from the early clock. The word "somewhat" means herein about one sixth of the width of one bit of the serial data.

These two byte clocks (early clock and delay clock) and the bit clock are supplied to the additional information check circuits 670 to 673 of all the channels.

The delay adjustment is completed in the variable delay circuits 610 to 613 as described above, and therefore all the channels are in phase without any skew at the time of data transfer immediately after the idle time. Thus, the additional bits A are in phase for all the channels, so that the bit clock, the early clock and the delay clock can be shared by all the channels.

The additional information check circuits 671 to 673 corresponding to the data DATA1 to DATA3 of the channels other than the reference channel constantly read the additional bit A contained in the corresponding serial data with the two signals including the early clock and the delay clock, and outputs the result of reading as a 2-bit digital signal and applies it to the variable delay circuits 651 to 653.

In the case where the bit of the serial data of the DATA1 is "1" at the rise time of the early clock, the output of the first latch circuit 71 assumes a high level for the time corresponding to one byte. In the case where the bit of the serial data is "0" at the rise time of the early clock, on the other hand, the output of the first latch circuit 71 assumes a low level for the time corresponding to one byte.

In similar fashion, in the case where the bit of the serial data of the DATA1 is "1" at the rise time of the delay clock, the output of the second latch circuit 73 assumes a high level for the time corresponding to one byte. In the case where the bit of the serial data is "0" at the rise time of the delay clock, on the other hand, the output of the second latch circuit 73 assumes a low level for the time corresponding to one byte.

A similar operation is performed also in the channels of DATA2 and DATA3.

In FIG. 10, the early clock rises at time point t1. At this time point, the bit of DATA1 is "1" of the additional bit A, and therefore, as shown in (g), the latch result output from the first latch circuit 71 shown in FIG. 8 is high in level. At time point t2, on the other hand, the delay clock has risen and the bit of DATA1 at this time point is also "1" of the additional bit A. Therefore, the output of the second latch circuit 73 is also at high level, as shown in (h).

Also at time point t3, the early clock rises. Since the bit of DATA1 is the additional bit A of "0", and therefore, as shown in (g), the latch result constituting the output of the first latch circuit 71 is at low level. At time point t4, the delay clock rises. Since the bit involved is also the additional bit A of "0", the output of the second latch circuit 73 is at low level as shown in (h).

In this way, the output signal of the first latch circuit 71 alternates between "1" and "0" for every byte as shown in (i). Also, the output signal of the second latch circuit 73 alternates between "1" and "0" for every byte as shown in (j).

The first determination circuit 72 converts the signal shown in (g) into a signal shown in (i) and thus makes up a check signal for DATA1. The signal shown in (i) is a check signal obtained by shifting the signal of (g) in accordance with a predetermined timing such as the byte clock of the reference signal. The first determination circuit 72 determines whether the check signal alternates between "0" and "1" over a predetermined number of bytes. In the case where the check signal alternates between "0" and "1" over a predetermined number of bytes, it indicates that the additional bit A contained in the DATA1 is included in a tolerable range. Therefore, the first determination circuit 72 determines that the DATA1 is not earlier than the reference channel and outputs a "1" signal. In the case where the check signal fails to alternate between "0" and "1" over a predetermined number of bytes, on the other hand, it indicates that the additional bit A is not located within the tolerable range. Therefore, the determination circuit 72 determines that the DATA1 is earlier than the reference channel, and outputs a "0" signal. In the case of FIG. 10, the check signal shown in (i) alternates between "0" and "1" over a predetermined number of bytes, and therefore the first determination circuit 72 outputs a "1" signal. In this case, it is determined that the DATA1 is not earlier than the reference channel.

In similar manner, the second determination circuit 74 converts the signal shown in (h) into a signal shown in (j) and thus makes up a check signal for DATA1. The signal shown in (j) is a check signal obtained by shifting the signal of (h) in accordance with a predetermined timing such as the byte clock of the reference signal. The second determination circuit 74 determines whether the check signal alternates between "0" and "1" over a predetermined number of bytes. In the case where the check signal alternates between "0" and "1" over a predetermined number of bytes, it indicates that the additional bit A contained in the DATA1 is included in a tolerable range. Therefore, the second determination circuit 74 determines that the DATA1 is not later than the reference channel and outputs a "1" signal. In the case where the check signal fails to alternate between "0" and "1" over a predetermined number of bytes, on the other hand, it indicates that the additional bit A is not located within the tolerable range. Thus, the determination circuit 74 determines that the DATA1 is later than the reference channel, and outputs a "0" signal. In the case of FIG. 10, the check signal shown in (j) alternates between "0" and "1" over a predetermined number of bytes, and therefore the second determination circuit 74 also outputs a "1" signal. In this case, it is determined that the DATA1 is not later than the reference channel.

In conclusion, the DATA1 is neither earlier nor later than the reference channel.

Regarding DATA2, at time point t1 when the early clock rises, the bit of the DATA2 is bit 9, and the latch result constituting the output of the first latch circuit 81 of FIG. 9 corresponds to the result of latching bit 9 as shown in (l). In the case where the value of bit 9 is "1", the latch result is also "1", while in the case where the value of bit 9 is "0", the latch result is also "0". The latch result, which depends on the value of bit 9 in this way, is designated by a dotted line indicating "inconstant" in (l) of FIG. 10.

At time point t2 when the delay clock rises, on the other hand, the bit of the DATA2 is the additional bit A of "1", and therefore the output of the second latch circuit 83 is at high level as shown in (m).

At time point t3 when the early clock rises, the bit of the DATA2 is also bit 9, and therefore the latch result constituting the output of the first latch circuit 81 is also inconstant as shown in (l).

At time point t4 when the delay clock rises, the bit is the additional bit A of "0", and therefore the latch result is at low level as shown in (m).

In this way, a signal of inconstant level corresponding to the value of bit 9 is output as shown in (n) from the second latch circuit 81, while a signal alternating between "1" and "0" for each byte is produced as an output (o) of the second latch circuit 83.

The first determination circuit 82 converts the signal shown in (l) into a signal shown in (n) and thus makes up an A bit check signal 0 for DATA2. The signal shown in (n) is a check signal obtained by shifting the signal of (l) in accordance with a predetermined timing such as the byte clock of the reference signal. The first determination circuit 82 determines that the A bit check signal O fails to alternate between "0" and "1" over a predetermined number of bytes, and therefore, the DATA2 is earlier than the DATA0 and outputs a "0" signal.

The second determination circuit 84 converts the signal shown in (m) into a signal shown in (o) and thus makes up an A bit check signal 1 for DATA2. The signal shown in (o) is a check signal obtained by shifting the signal of (m) in accordance with a predetermined timing such as the byte clock of the reference signal. The second determination circuit 84 determines that the check signal alternates between "0" and "1" over a predetermined number of bytes, and therefore, the DATA2 is not later than the reference channel and outputs a "1" signal.

A similar operation is performed also for the DATA3.

In the case where the variable delay circuits 651 to 653 corresponding to the channels of DATA1 to DATA3 receive a "1" signal from the first determination circuit and a "0" signal from the second determination circuit as the result of checking the additional bit A, the particular data are delayed behind the reference data and therefore the variable delay circuits 651 to 653 operate to reduce the data delay amount. Assume that the variable delay circuits 651 to 653 receive a "0" signal from the first determination circuit and a "1" signal from the second determination circuit as the result of checking the additional bit A. Since the particular data is ahead of the reference data, the variable delay circuits 651 to 653 operate to increase the delay amount of the data. As a result, the variable delay circuits 651 to 653 are controlled so that the result of checking the two bits output from each of the additional information check circuits 671 to 673 are all "1".

As described above, a skew which may occur during data transmission can be corrected by finely adjusting the delay value of the variable delay circuit corresponding to the channel in which the skew has occurred, following the procedure described above.

The AND gate 68 outputs a "1" signal in the case where all the output signals of the additional information check circuits 671 to 673 are "1", i.e. free of skew. The logic circuit 69, on the other hand, outputs an alarm signal "1" when all of at least two bits output from the additional information check circuits 671 to 673 are "0". As a result, the logic circuit 69 detects the time point when the skew has increased to such an extent that the fine adjustment of the delay value of the variable delay circuits is impossible.

Figure 11:
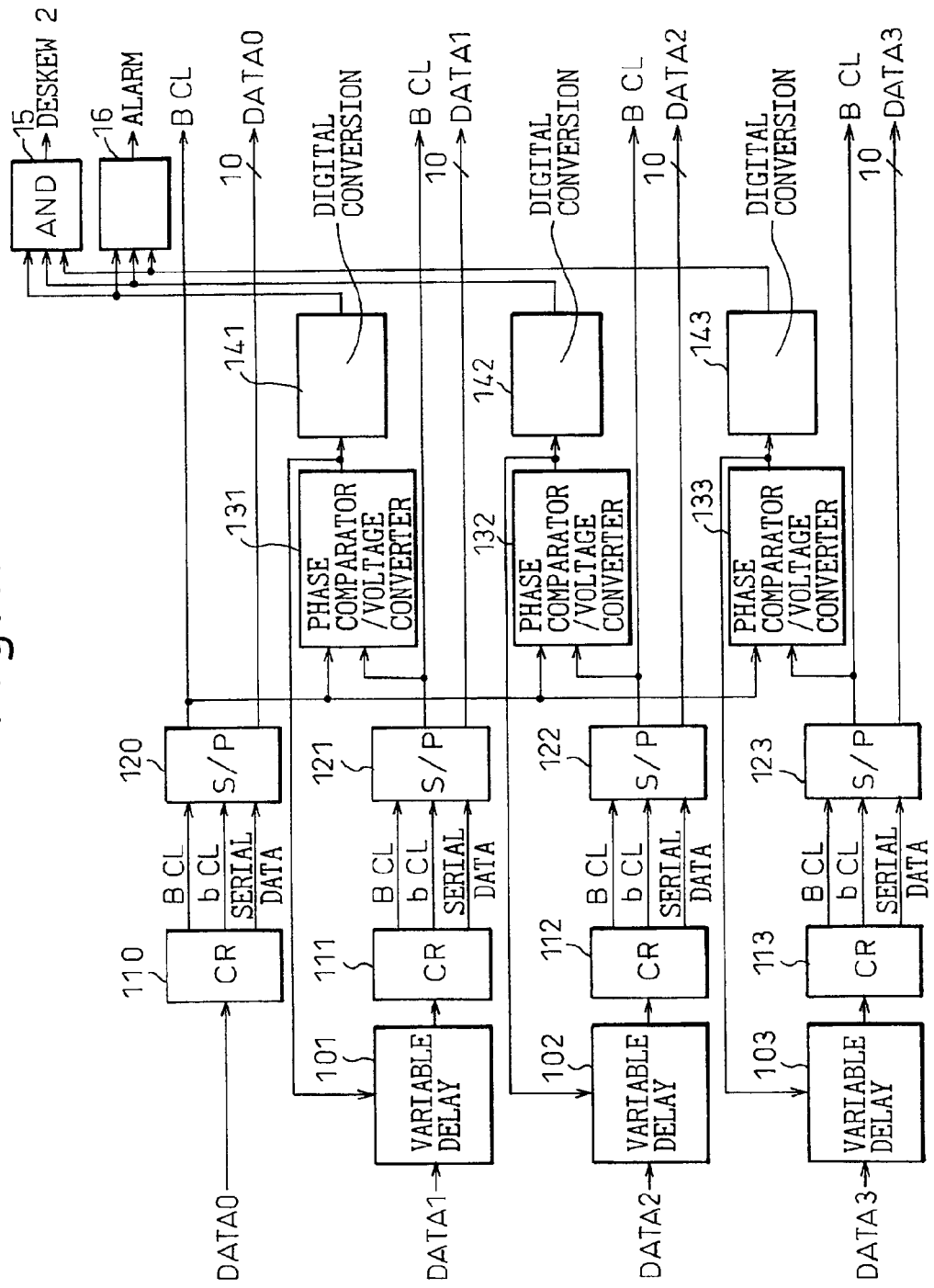
FIG. 11 is a circuit diagram showing the secondary skew correction means according to another embodiment of the invention.

FIG. 11 is a circuit diagram showing the secondary skew correction means 32 shown in FIG. 3 according to another embodiment of the invention. The main difference between the circuit of FIG. 7 and the circuit of FIG. 11 lies in that the additional bit A is constantly monitored using the early clock and the delayed clock in FIG. 7, while the byte sync signals for all the channels are generated during the reception of the idle signal and thereby the phase difference between the byte sync signals of the channels is monitored in the circuit of FIG. 11.

In order to monitor the phase difference between the byte sync signals, the circuit of FIG. 11 includes four variable delay circuits 101 to 103 for receiving the outputs of the variable delay circuits 610 to 613 of FIG. 6, four clock recovery circuits 110 to 113, four serial/parallel conversion circuits 120 to 123, three phase comparator/voltage conversion circuits 131 to 133, three digital conversion circuits 144 to 143, an AND gate 15 and an alarm detecting logic circuit 16.

FIG. 12 is a time chart for explaining the operation of the circuit shown in FIG. 11. In FIG. 12, (a) shows the same receiving data as (a) of FIG. 10.

Now, the operation of the variable delay circuits 101 to 103 will be explained.

The apparatus shown in FIG. 11 also uses the DATA0 channel as a basic channel. The line of the DATA0 includes the clock recovery circuit (CR) 110 for outputting the serial data shown in (a), the bit clock (b CL) shown in (b) and the byte clock (B CL) shown in (c) of FIG. 12.

On the line of the DATA1 to DATA3, the variable delay circuits 101 to 103 are connected to the clock recovery circuits 111 to 113, respectively. The clock recovery recovery circuits 111 to 113 output the serial data, the bit clock and the byte clock of the corresponding receiving data. Specifically, in FIG. 12, (d) shows the serial data of DATA1, (e) the bit clock extracted from the particular serial data, and (f) the byte clock extracted from the same serial data. FIG. 12 (h) shows the serial data of the DATA2, (i) the bit clock extracted from the serial data, and (j) the byte clock extracted from the serial data.

The serial data, the bit clock and the byte clock output from the clock recovery circuits 110 to 113 are input to the serial/parallel conversion circuits 120 to 123, respectively, from which the byte clock B CL and the output data DATA0 to DATA3, respectively, are output.

The phase comparator/voltage conversion circuit 131 converts the phase difference between the byte clock of DATA0 and the byte clock of DATA1 into a voltage, and applies the same voltage to the variable delay circuit 101. In similar fashion, the phase comparator/voltage conversion circuit 132 converts the phase difference between the byte clock of DATA0 and the byte clock of DATA2 into a voltage, and applies the same voltage to the variable delay circuit 102. Also, the phase comparator/voltage conversion circuit 133 converts the phase difference between the byte clock of DATA0 and the byte clock of DATA3 into a voltage, and applies the same voltage to the variable delay circuit 103. The digital converters 141 to 143 detect that the outputs of the phase comparator/voltage conversion circuits 131 to 133 assume the lowest value, and output a high-level signal only when the outputs of the phase comparator/voltage conversion circuits 131 to 133 assume the lowest value.

FIG. 12 (g) shows the exclusive OR (EXOR) resulting from the comparison between the phase of the byte clock of (c) output from the serial/parallel conversion circuit 120 corresponding to DATA0 and the phase of the byte clock of (f) output from the serial/parallel conversion circuit 121 corresponding to DATA1. In this case, the exclusive OR indicates that the byte clock of DATA1 is somewhat earlier than the byte clock of DATA0.

FIG. 12 (k) shows the exclusive OR (EXOR) resulting from the comparison between the phase of the byte clock of (c) output from the serial/parallel conversion circuit 120 corresponding to DATA0 and the phase of the byte clock of (j) output from the serial/parallel conversion circuit 122 corresponding to DATA2. In this case, the exclusive OR indicates that the byte clock of DATA2 is somewhat later than the byte clock of DATA0.

The variable delay circuits 101 to 103 corresponding to the channels of DATA1 to DATA3, respectively, upon receipt of a voltage corresponding to the phase difference from the phase comparator/voltage conversion circuits 131 to 133, determine the delay value to reduce the phase difference.

In this way, the digital conversion circuits 141 to 143 always output a "1" signal.

At the time point when the adjustment of the delay amount in the variable delay circuits 610 to 613 and the variable delay circuits 101 to 103 is completed, the data transfer is started between the transmitter 51 and the receiver 52 (FIG. 5). The phase comparator/voltage conversion circuits 131 to 133 constantly continue to detect and output the phase difference between the byte clock of DATA0 and the byte clock of a particular data channel. As long as a new skew is not generated, the digital conversion circuits 141 to 143 each continue to output a "1" signal. Upon generation of a skew, on the other hand, the delay value of the variable delay circuit corresponding to the channel which has generated the skew among the variable delay circuits 101 to 103 is finely adjusted according to the aforementioned procedure thereby to correct the skew.

The AND gate 15 outputs a "1" signal when all the output signals of the digital conversion circuits 141 to 143 are "1", i.e. free of skew. The logic circuit 91, on the other hand, outputs an alarm signal "1" when at least two of the outputs signals of the digital conversion circuits 141 to 143 assume "0". As a result, it is possible to detect that the skew has increased to such an extent that the fine adjustment of the delay value of the variable delay circuits is impossible.

As will be understood from the foregoing description, according to the present invention, a skew is always automatically corrected even during the data transfer simply by adding an additional bit to the transfer data.

Also, the provision of the idle pattern detection circuit in the receiving circuit eliminates the need for deskew work by the operator.

Further, in the case of a high-speed transmission system, the code conversion (for example, 4B4B or 8B10B conversion) is generally employed to improve the transmission quality. In view of the fact that the additional information alternating between "0" and "1" is added to the head of each byte, the imbalance of the code duty of the transfer data can be obviated, thereby eliminating the need of the code conversion which would deteriorate the data transmission efficiency.

What is claimed is:

1. A skew correction apparatus receiving a plurality of serial data through a plurality of channels and reducing the skew amount constituting a phase shift between a plurality of said serial data, comprising:

first skew correction means for detecting the skew between a plurality of said serial data during an idle time when no data is transmitted and correcting the delay amount of each of a plurality of said serial data in such a manner as to reduce said skew amount; and second skew correction means for detecting the skew amount generated between a plurality of said serial data during the transmission of the data corrected by said first correction means and correcting the skew amount of each of a plurality of said serial data in such a manner as to reduce the skew amount to zero, wherein;

said first skew correction means comprises an idle state detection circuit for detecting an idle state and a primary skew correction circuit for correcting the delay amount of each of a plurality of said serial data by a primary skew correction at the time of detecting said idle state, and said second skew correction means comprises a skew monitor circuit monitoring the skew amount during the transmission of a plurality of said serial data having a delay amount corrected by said primary skew correction circuit, and a delay adjust circuit correcting the delay amount of each of a plurality of said serial data in such a manner that the skew amount detected by the skew monitor circuit is reduced to zero.

2. A skew correction apparatus according to claim 1, wherein said primary skew correction circuit includes a select circuit for selecting one of a plurality of said serial data and a delay amount control circuit for controlling the delay amount of the received serial data in such a manner as to minimize the phase difference between said selected serial data and each of a plurality of said serial data.

3. A skew correction apparatus according to claim 1, wherein each of a plurality of said received serial data is configured with continuous bytes and includes additional information at the head of each of said bytes in addition to the transmission data;

wherein said skew monitor circuit includes:

a clock recovery circuit for extracting a bit clock for identifying the bits of reference serial data, a byte clock for identifying the byte of said reference serial data, an early clock changed later than the byte clock within the range of the timing width corresponding to the additional information contained in said reference serial data, and a delay clock changed later than said early clock within the range of the timing width corresponding to said additional information contained said reference serial data, said reference serial data being received through selected one of a plurality of said channels;

an additional information check circuit for determining whether the time of change of said early clock and the time of change of said delay clock are included or not in the timing width corresponding to said additional information contained in the serial data received through a channel other than said selected channel; and a second delay adjust circuit for correcting the delay amount of the serial data of a corresponding channel in such a manner as to reduce the skew amount to zero in the case where it is determined that at least one of the time of change of said early clock and the time of change of said delay clock is not contained in the receive timing width of said additional information contained in the serial data received by said additional information check circuit through a channel other than said selected channel.

4. A skew correction apparatus according to claim 3, wherein said additional information is one-bit information having "1" and "0" alternating for each of the continuous bytes;

wherein said additional information check circuit includes, for each channel, a first latch circuit for outputting a first latch signal which assumes a first state in the case where the serial data is "1" and assumes a second state different from the first state in the case where the serial data is "0" at the time of change of said early clock; a second latch circuit for outputting a second latch signal which assumes a first state in the case where the serial data is "1" and assumes a second state different from the first state in the case where the serial data is "0" at the time of change of said delay clock;

a first determination circuit for determining whether the output of said first latch circuit deviates from the alternating pattern of "1" and "0" over a predetermined number of bytes; and a second determination circuit for determining whether the output of the second latch circuit deviates from the alternating pattern of "1" and "0" over a predetermined number of bytes; and wherein said second delay adjust circuit includes a variable delay circuit for adjusting, for each channel, the delay amount in such a manner as to advance the phase of the serial data of said channel with respect to said reference serial data in the case where the output of said first determination circuit deviates from the alternating pattern of "1" and "0" over a predetermined number of bytes, and adjusting, for each channel, the delay amount in such a manner as to retard the phase of the serial data of said channel with respect to said reference serial data in the case where the output of said second determination circuit deviates from the alternating pattern of "1" and "0" over a predetermined number of bytes.

5. A skew correction apparatus according to claim 1, wherein each of a plurality of said received serial data is configured with continuous bytes;

wherein said skew amount monitor circuit includes:

a reference channel clock recovery circuit for extracting a reference byte clock for identifying the bytes of the reference serial data received through selected one of a plurality of said channels;

at least one normal channel clock recovery circuit for extracting a normal byte clock for identifying the bytes of the serial data received through a channel other than said selected channel;

a phase comparator/voltage conversion circuit for detecting the phase difference between the phase of the byte clock extracted by said normal channel clock recovery circuit and the phase of said byte clock extracted by said reference channel clock recovery circuit, and converting said phase difference into a voltage value; and a second delay adjust circuit for correcting the delay amount of the serial data of a corresponding channel in such a manner as to reduce the skew amount to zero in accordance with the voltage value.

* * * * *

UNITED STATES PATENT AND TRADEMARK OFFICE
CERTIFICATE OF CORRECTION

PATENT NO. : 6,937,681 B2 Page 1 of 1
APPLICATION NO. : 09/805110
DATED : August 30, 2005
INVENTOR(S) : Takayuki Watanabe It is certified that error appears in the above-identified patent and that said Letters Patent is hereby corrected as shown below:

Column 13, Line 6, after "wherein" delete ";" and insert -- : -- therefor.
Column 13, Line 14, after "amount" insert -- , --.
Column 13, Line 29, delete "Askew" and insert -- A skew -- therefor.
Column 14, Line 40, delete "Askew" and insert -- A skew -- therefor.

Signed and Sealed this

Thirtieth Day of October, 2007

JON W. DUDAS
*Director of the United States Patent and Trademark Office*